May 5, 1931.  J. MORTON  1,804,106
MANUFACTURE OF CHENILLE AND OTHER FABRICS
Filed Sept. 9, 1929   5 Sheets-Sheet 2

INVENTOR
J. MORTON
BY
ATTORNEY

May 5, 1931.   J. MORTON   1,804,106
MANUFACTURE OF CHENILLE AND OTHER FABRICS
Filed Sept. 9, 1929   5 Sheets-Sheet 3
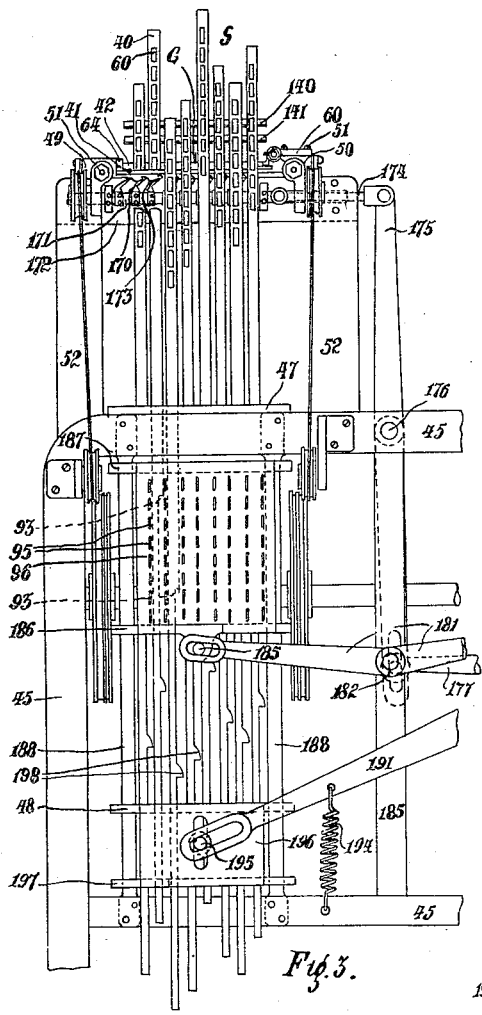
Fig. 3.
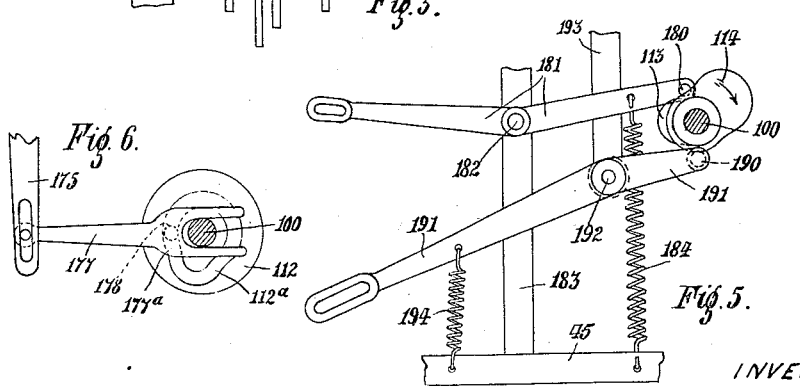
Fig. 6.
Fig. 5.
INVENTOR
J. MORTON
BY
ATTORNEY May 5, 1931.                    J. MORTON                    1,804,106
MANUFACTURE OF CHENILLE AND OTHER FABRICS
Filed Sept. 9, 1929          5 Sheets-Sheet 4
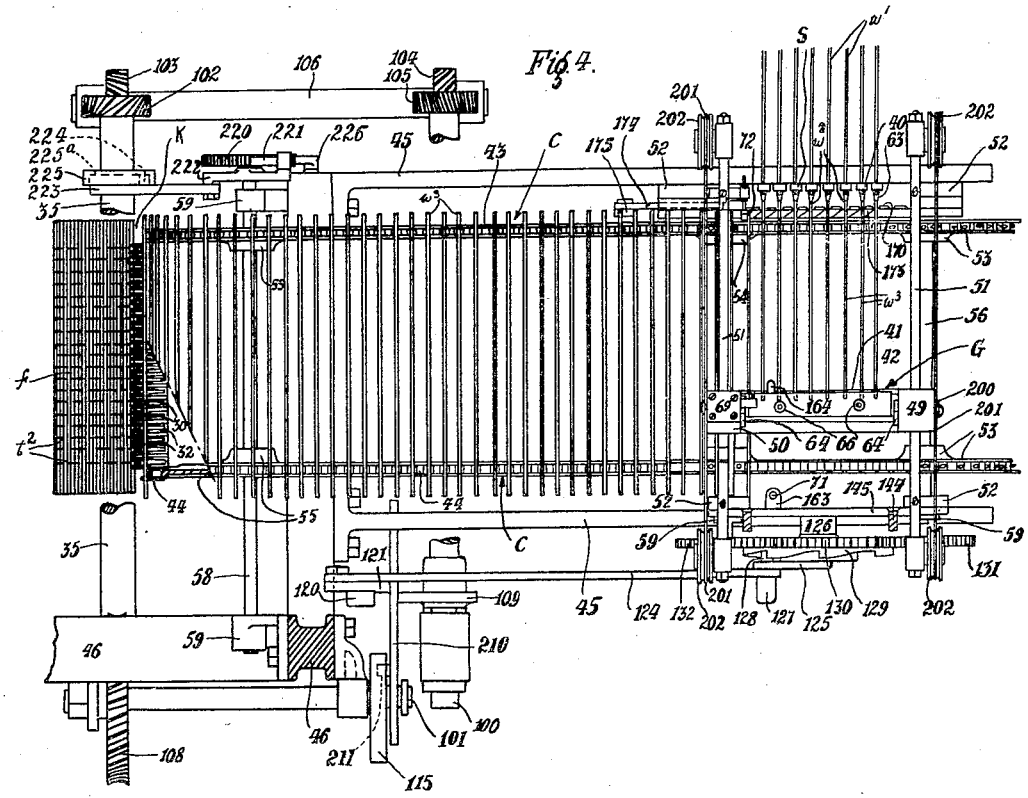
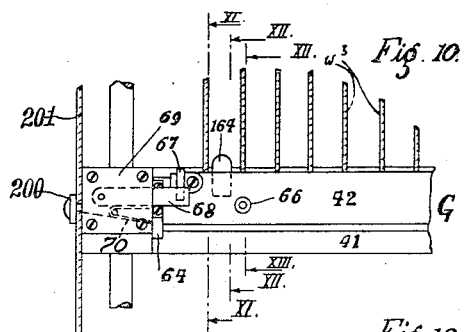
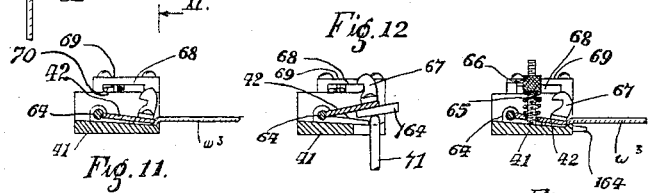
INVENTOR
J. MORTON
BY
ATTORNEY May 5, 1931. J. MORTON 1,804,106
MANUFACTURE OF CHENILLE AND OTHER FABRICS
Filed Sept. 9, 1929 5 Sheets-Sheet 5
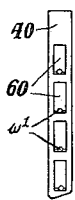
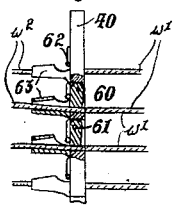
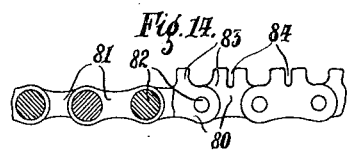
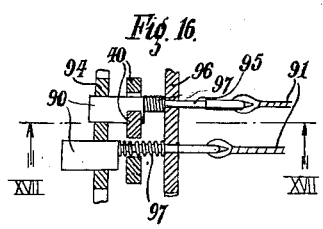
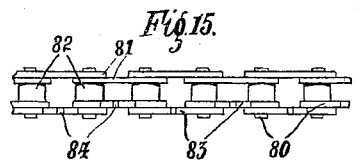
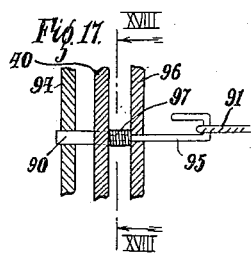
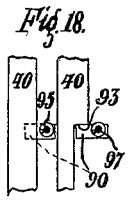
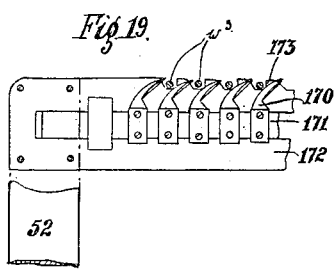
INVENTOR
J. MORTON
BY
ATTORNEY Patented May 5, 1931

1,804,106

UNITED STATES PATENT OFFICE

JAMES MORTON, OF WEST LOTHIAN, SCOTLAND

MANUFACTURE OF CHENILLE AND OTHER FABRICS

Application filed September 9, 1929, Serial No. 391,369, and in Great Britain September 26, 1928.

This invention relates to the manufacture of chenille and other fabrics.

In the manufacture of chenille fabrics, as is well known, it is usual, first, to make a preparatory cloth and then cut it up into strips of chenille which are, subsequently, woven in a carpet or other loom into the finished fabric.

The usual method of manufacturing the preparatory or "weft-woven" cloth in a loom and, thereafter, cutting the cloth into strips, involves the employment of numerous shuttles for the different coloured wefts and it is necessary, in the weaving, to change the shuttles in order to introduce new colours, each change of colour involving the use of a different shuttle. Other methods of making the cloth have been proposed in order to facilitate economy and rapidity of production, but, in all the methods heretofore employed, only a single thread or coloured weft is dealt with at a time.

My invention has for its main feature the fact that a mass or multiplicity of yarns or threads (hereinafter referred to as "threads") are supplied in spaced relationship and in line, then cut to a desired length, then the cut threads conveyed forward in parallel formation and thereafter transferred to needles for incorporation, as wefts, in the fabric being manufactured. In this manner a multiple weft supply is provided for incorporation into the fabric being manufactured.

In the case of chenille weft cloth or other multi-coloured fabrics a mass of coloured threads can be supplied from bobbins to a selecting frame controlled by the jacquard or other selecting mechanism so as to select the proper threads and these selected threads are aligned, cut, and conveyed, as wefts, to the needles as aforesaid.

In the case of the manufacture of plain fabrics or striped fabrics the mass of threads may be supplied from a beam or otherwise and cut, conveyed and transferred as aforesaid.

The invention comprises other features all as hereinafter described and as particularly set out in the claims at the end of this specification.

In carrying out my invention in the manufacture of a preparatory cloth, as aforesaid, for chenille fabrics the coloured threads for the wefts are supplied en masse from a bank of bobbins to a selecting frame characterized by a series of selectors or carriers which, under the manipulation of jacquard or other suitable selecting mechanism, present in spaced alignment a multiplicity of selected threads to gripping mechanism which latter acts, in such manner, as to pull forward the selected threads a certain pre-determined distance, whereupon the forwardly pulled parts are automatically deposited, side by side, in parallel formation on a conveyor and are severed. The conveyor carries these severed threads, which are all cut to the same length, to transfer mechanism which presents them individually, or otherwise, as wefts, to a bank of needles, which latter, by their action, bind the wefts, as presented, to a series of spaced warps and securely fasten them thereto so as to form the chenille weft cloth. The needle action is preferably the same as in a warp knitting machine, the selected wefts being bound by the knitting or crocheting needles to the warp chains or strands.

The selecting and gripping mechanisms work continuously and automatically the one selecting a series of threads and presenting them in alignment and the other, at each action, seizing the selected and aligned threads and pulling them forward whereupon they are deposited in parallel formation on the conveyor, then cut and released, the conveyor automatically moving them forward in order to be transferred to the needles. These parts all work in timed relationship so that a supply of selected wefts is always being maintained for the needles which latter act very rapidly and incorporate them as weft in the cloth being manufactured.

The chenille weft cloth, when made, can be wound on a take-up beam for future use or it may be sumbitted to a known form of cutting mechanism for the purpose of being cut up into strips of chenille ready to be woven, as usual, in a carpet or other loom, into the finished chenille fabric.

The cloth may be given a width sufficient to enable a large number of strips of chenille to be cut from a single piece of cloth, all having the same colour scheme and from these strips a number of rugs or carpets can be produced all having the same pattern; or, the cloth may be made narrow enough to provide for any small number of articles, as desired, to be manufactured without waste.

When it is desired to manufacture plain fabrics, the threads can be supplied, en masse, from a beam or otherwise and be presented in spaced relationship and in alignment to the grippers which, at each action, seize the aligned threads and pull them forward in order to be cut in length and then conveyed as wefts to the needles.

In the case of striped coloured fabrics, with constant repeats, the threads can be supplied from a beam upon which they are arranged in proper order to give the stripes desired, and be dealt with in a similar manner.

In these cases the actual selecting mechanism is not required and may be put out of action or dispensed with.

The selecting frame may be larger or smaller according to the nature of the fabric being manufactured and the gripping mechanism may be arranged to pull the selected threads forward any predetermined distance according as long or short wefts are required.

It will be seen that, by this invention, wefts, cut to length, can be supplied in great numbers and in rapid succession, and, in the case of coloured wefts, they can be selected and presented as required to suit the nature and the pattern or design of the final fabric.

The number of cut wefts which may be simultaneously placed on the conveyor may be very large, up to a hundred or more, as the mechanism may be such as to give any desired capacity and since the sets or batches of wefts may be placed upon the conveyor in rapid succession the fabric being manufactured may be very rapidly produced.

It is considered, by this invention, that chenille and other fabrics can be made much more rapidly and cheaply than heretofore.

I will now describe, by way of example and with reference to the accompanying drawings, a method of manufacturing a preparatory cloth to be subsequently cut into strips of chenille.

On the drawings:—

Fig. 3 is a front side elevation of part of the apparatus, certain parts being omitted and certain others being broken away, for clearness;

Fig. 4 is a plan corresponding to Fig. 3, certain parts being broken away for clearness;

Figs. 5 and 6 are sectional front elevations of cam-mechanisms referred to hereinafter;

Figs. 7, 8 and 9 are detail views at right angles to one another of a top portion of a selector;

Fig. 10 is a detail view showing gripping mechanism in plan;

Figure 1:
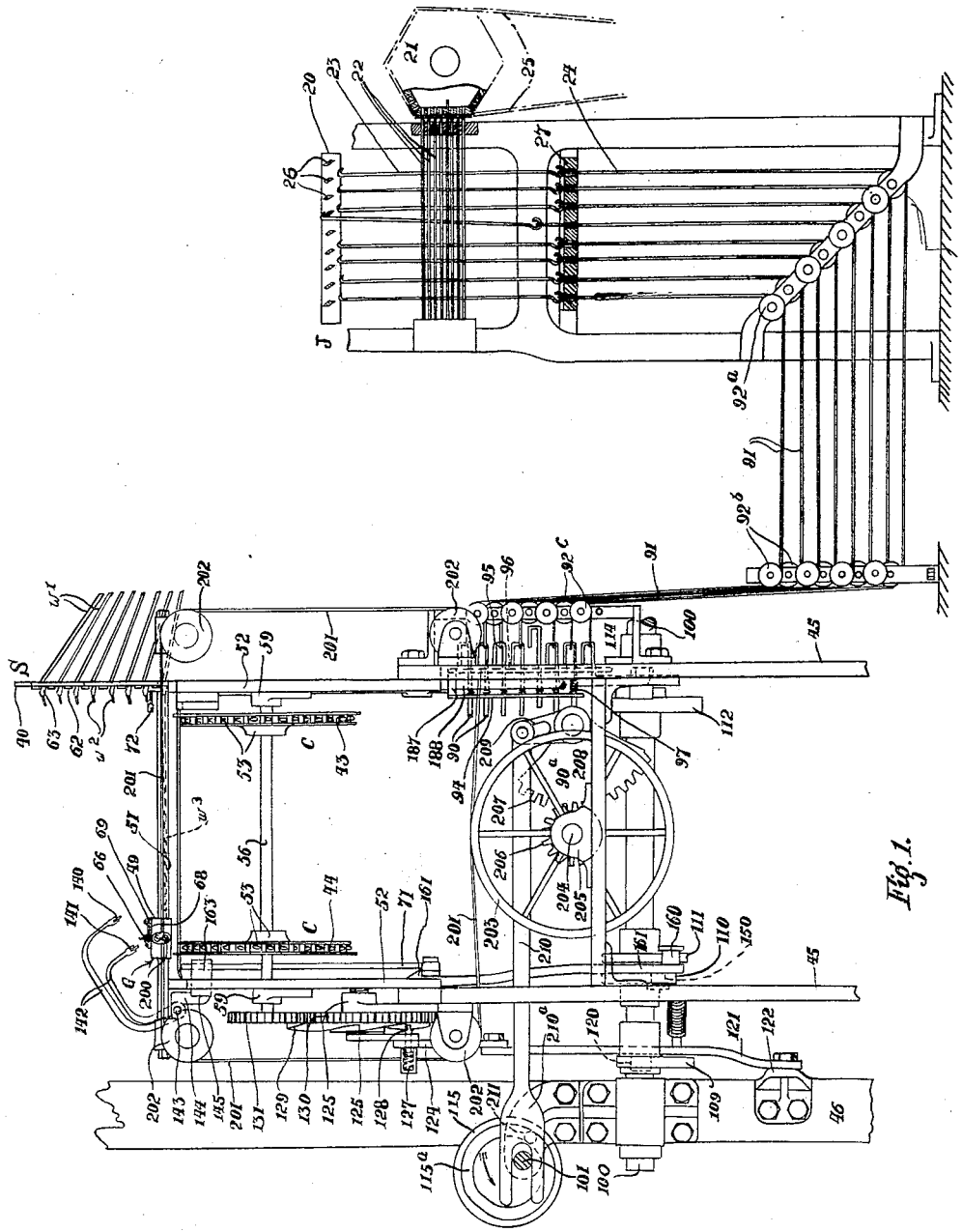
Fig. 1 is an end elevation of the apparatus, showing the same associated with jacquard mechanism.

Figs. 11, 12, and 13 are sections taken respectively on the lines XI—XI, XII—XII, and XIII—XIII of Fig. 10, Fig. 12 showing certain of the parts in different positions;

Figs. 14 and 15 are detail views of a conveyor chain;

Fig. 16 is a detail sectional plan of intermediate portions of two selectors;

Fig. 17 is a section on the line XVII—XVII of Fig. 16, and Fig. 18 is a section on the line XVIII—XVIII of Fig. 17;

Fig. 19 is a detail view of thread cutting knives.

In the drawings only so much of the jacquard control mechanism and of the warp-knitting mechanism has been shown as it is necessary for the understanding of their use in combination with the apparatus according to the invention, since both mechanisms are well-known.

The jacquard mechanism (Fig. 1) denoted generally by J comprises the usual vertically reciprocable griffe-frame 20, horizontally reciprocable card-cylinder 21, needles 22, hooks 23 and neck-cords 24. In operation, all except one of the needles in each vertical row are displaced to the left at each reciprocation of the card-cylinder under the selective action of the cards 25, leaving one of the hooks in a position in which it will be engaged by one of the griffe-bars 26 as the frame 20 rises. The hook thus left will be lifted away from the bottom board 27 and will carry with it the respective cord 24.

The main parts of the knitting mechanism K shown are the usual bank of latch-needles 30 and eyelets 31 through which latter the warp threads $t'$ pass to the needles 30, which work in association with a row of sinkers 32 adapted in a manner hereinafter described to receive the wefts and to deliver them in succession to the needles 30. The usual warp yarn guide bar 33 carrying the eyelets 31 has imparted to it in known manner a somewhat circular movement which causes the eyelets 31 to lap the warps $t'$ appropriately around the needles 30 in order to form the stitches. The numeral 34 denotes the usual trick-bar, or needle-bar, through slots 34a in which the needles 30 reciprocate and over which the chenille preparatory cloth or fabric $f$ passes. The movements of the various parts of the knitting mechanism are all derived in known manner from eccentrics on a main rotary shaft 35, the sinkers 32 being supported by oscillating arms 32d on a rockshaft 36 operatively connected to eccentric rods 37 by crank-arms 36a, and the needles being reciprocated by a bar 30a on a vertically movable shaft 38 secured between eccentric rods 39.

The apparatus for supplying the wefts under the control of the jacquard J to the knitting mechanism K will now be described.

The apparatus mainly comprises selectors S, including a plurality of vertically movable rods 40, a gripper G including a pair of jaws 41, 42 and a conveyor C, including a pair of spaced chains 43, 44.

These parts are supported by side frames 45 secured to the frame 46 of the knitting machine. The selector rods 40 are guided by a stationary bar 47 (Fig. 3) on one of the side frames 45 and by a movable bar 48 referred to hereinafter. The jaws 41, 42, are carried by guide-blocks 49, 50, which are slidably mounted on guides 51 bridging upward extensions 52 of both frames 45. The conveyor chains 43, 44, are driven by pairs of sprocket-wheels 53, 54 and 55 respectively mounted on shafts 56, 57 and 58 journalled in stationary bearings 59.

Each selector rod (referred to hereinafter as a selector) 40 is provided towards its top end with a plurality of rectangular apertures, in each of which a one-way locking tumbler 60 (see particularly Figs. 7, 8, and 9) is pivotally mounted, the pivot being indicated by 61. Each tumbler 60 is pressed into its aperture by a light spring 62 secured to the respective selector. Small guide-tubes 63 are secured to the rear faces of the selectors and are each arranged so as to register with a small clearance space between each tumbler and the base of its aperture. The entire arrangement is such that one of a number of threads leading for instance from bobbins (not shown) by way of any suitable guide can be passed from the front of the selectors, as indicated at $w^1$, through the clearance space aforesaid, the respective tumbler 60 thus becoming slightly canted and tending, under the action of its spring 62, to wedge the thread against the base of the aperture. By this arrangement, the threads can be drawn freely rearwards through the apertures and the guide-tubes 63, but are locked against retrograde movement.

The grippers G comprise, as aforesaid, a pair of jaws, viz., a lower jaw 41 and an upper jaw 42 (see particularly Figs. 10 to 13) certain ends of thread denoted by $w^3$ being shown gripped between these jaws. The lower jaw 41 is rigidly secured to the guide-blocks 49, 50, and the upper jaw 42 is pivotally mounted at its ends in brackets 64 on the jaw 41 and is pressed towards the latter by springs 65 (Fig. 13) whose strength can be adjusted by nuts 66. The upper jaw 42 has a catch 67 co-operating with a trigger 68 which is pivotally mounted in a recess within a cap 69 on the guide-block 50 and which is constantly acted upon by a spring 70. The co-operation between the catch 67 and trigger 68 is such that, when the upper jaw is raised by a plunger 71 (forming a part of cam-operated means hereinafter described), the catch rides past and as shown in Fig. 12, is engaged by the trigger, which holds the catch and also the upper jaw raised. The trigger 68 also co-operates with a fixed, but adjustable, abutment 72 (Figs. 1 and 4) which is adapted to engage the trigger and displace it so as to release the catch 67 and thereby permit the jaw 42 to close upon the jaw 41 under the action of the spring 65.

The conveyor chains 41, 42, each consists of pairs of links 80, 81 and inter-connecting rivets 82. The links 80 at the outer side of each pair is formed (see Figs. 14 and 15) with a projection 83 having a recess 84 for accommodation of the ends of the lengths of thread. The links 81 at the inner sides of the link-pairs are of standard form. Rails 85 are provided to support and guide the lower stretches of the chains. As shown, the chains move in unison upwards around the sprockets 53, below the guides 51, over the sprockets 54, downwards around the sprockets 55 and past the sinkers 32, and thence they return over the rails 85 to the sprockets 53.

The relative heights of the selectors are controlled from the jacquard by a number of stops 90 connected to continuations 91 of the neck-cords 24, these continuation cords 91 being led over any suitable fair-leads 92a, 92b and 92c. Each selector, about midway of its length, is formed with a shoulder 93 (Fig. 18) which co-operates with a vertical row of the stops 90. Each of these stops is guided for horizontal movement in a recess in a rear plate 94 and is provided with a hook-like stem 95, which passes freely through a front plate 96, and to which the respective cord 91 is secured. The stops 90 are pressed rearwards by springs 97 encircling their stems 95. The arrangement is such that, if a selector is raised to a predetermined maximum height through the guides 47, 48 and then allowed to fall, it will do so until its shoulder 93 contacts with that stop 90 which, for the time being, happens to be drawn forward by the respective cord 91. Accordingly, in virtue of this arrangement, any desired guide-tube 63, with its projecting thread end, denoted by $w^2$, can be brought to the level of the gripper jaws 41, 42 by fully raising the respective selector 40 and then permitting it to fall an appropriate amount, as determined by the jacquard through the intermediary of the stops 90.

Figure 2:
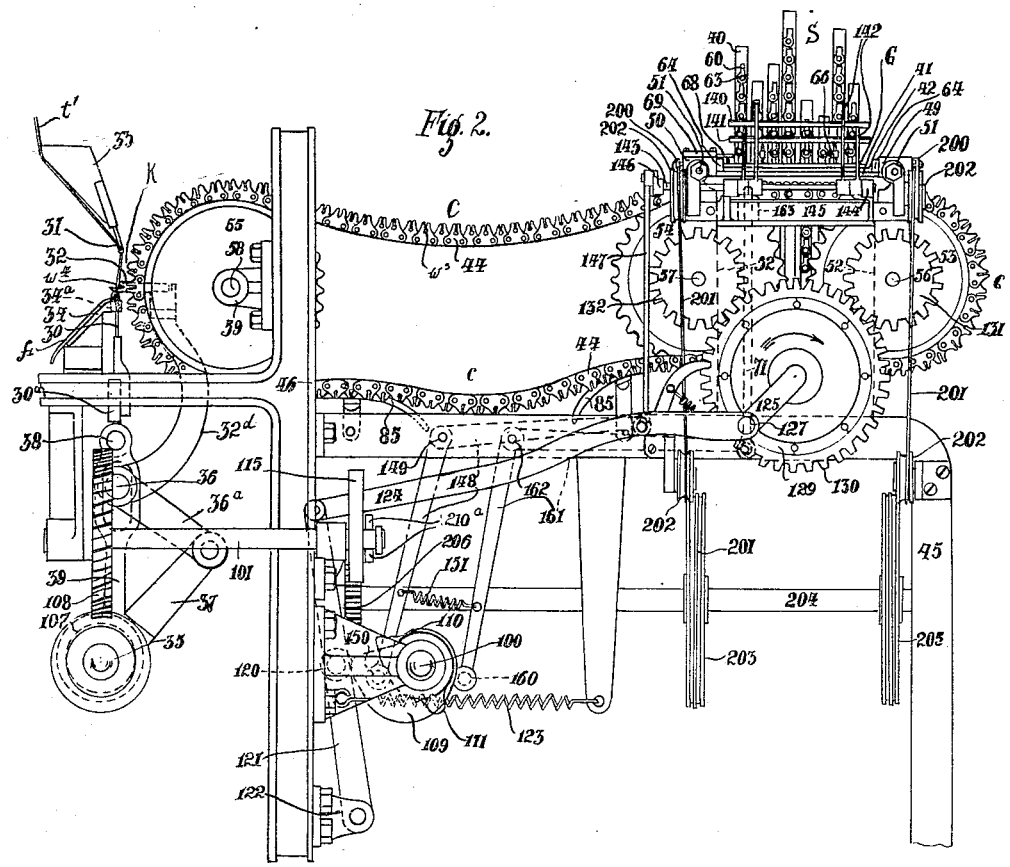
Fig. 2 is a rear side elevation of the apparatus, showing the same associated with warp-knitting mechanism.

The working parts of the apparatus are driven mainly from a primary cam-shaft 100 and a secondary cam-shaft 101 (see particularly Figs. 2 and 4). Both of the cam-shafts are rotated at reduced speeds from the main shaft 35 of the knitting machine K, the primary through spiral gear-wheels 102 to 105 and a counter-shaft 106, and the secondary through worm-gearing 107, 108. The cam-shaft 100 is provided with six cams 109 to 114 (see also Figs. 5 and 6) and the cam-shaft 101 is provided with a single cam 115. The functions of these cams will now be described seriatim.

The function of the cam 109 is to impart intermittent movements to the conveyor C so as to bring successive sections of the chains 43, 44 into line with the selectors 40. As shown best in Fig. 2, the cam 109 co-operates with a roller 120 on a lever 121 which is fulcrumed at its bottom end to a stationary bracket 122, the roller 120 being held against the cam by a spring 123. The lever 121, at its top end, is connected by a link 124 to an arm 125 freely journalled in a bracket 126. The arm 125 is fitted with a small casing 127 in which is mounted a spring-pressed plunger 128 co-operating with a notched ring 129 on a gear-wheel 130. Gear-wheels 131, 132 on the shafts 56, 57 of the sprocket-wheels 53, 54 mesh with the gear-wheel 130 in the ratio 1:2. The arm 125, which receives from the cam 109 swinging movements of over 45°, imparts recurrent step-by-step movements of 45° to the ring 129 and gear-wheel 130 in in the direction of the arrow, so that the gear-wheels 131, 132, and sprocket-wheels 53, 54 receive movements of 90° in the opposite direction, each of such movements causing a new section, consisting of eight links, of each of the chains 43, 44 to be brought into line with the selectors 40.

The function of the cam 110 is to control two presser bars 140, 141, which are adapted to press upon the thread parts $w^3$, gripped between the jaws 40, 41 and thereby force said parts to enter the recesses 84 of the links in the sections of the chains 43, 44, for the time being in line with the selectors 40. The bars 140, 141 are carried by pairs of arms 142 on a rock-shaft 143 journalled in bearings 144 on a member 145 bridging the frame extensions 52 at the rear of the apparatus. The shaft 143 has a crank 146 which is connected by a link 147 to one end of a bell-crank lever 148. The other end of this lever, which is fulcrumed at 149 on one side frame 45, carries a roller 150 acting as follower to the cam 110. The roller 150 is held against the cam by a spring 151. Once in each cycle of operations of the apparatus, the bars 140, 141 swing down on top of the parts $w^3$ and rise again.

The function of the cam 111 is to effect the opening of the gripper G to engage the thread ends $w^2$ projecting from the guide-tubes 63, of the selectors. The follower of the cam consists of a roller 160 carried at one end of a bell-crank lever 161 which is fulcrumed at 162 on one side frame 45 and which, at its other end, is connected to the plunger 71 previously referred to. The roller 160 is held against the cam 111 by the spring 151, which inter-connects the levers 148 and 161. The plunger 71 is guided in a fixed bush 163. Once in each cycle of operations, the cam 111 causes the plunger 71 to rise and strike a projection 164 on the upper jaw 42, thereby raising the latter away from the lower jaw 41.

The function of the cam 112 is to operate a gang of knives 170 (see Figs. 3, 4 and 19), which are adapted to sever the threads $w^2$ when they have been drawn through the guide-tubes 63 to the full extent of the movement of the gripper G on the guides 51. The knives are secured to a bar 171 slidably mounted in a slot in a member 172 bridging the frame extensions 52 at the front of the apparatus and co-operate with teeth 173 formed in the member 172. The sliding bar 171 is connected by a link 174 to the top end of a lever 175 fulcrumed at 176 on the front side frame 45. The lower end of the lever 175 is adjustably connected to a forked member 177, the fork $177^a$ whereof (see Fig. 6) straddles the shaft 100 and carries a roller 178 which enters the cam-groove $112^a$. Once in each cycle of operations, the cam reciprocates the knives 170 across the teeth 173, and the threads $w^2$ which pass through the spaces between said teeth are severed, thus leaving fresh thread ends projecting from certain of the guide-tubes 63.

The function of the cam 113 is to lower all the selectors 40, the purpose of this being that the threads which have been selected will be lowered into the spaces between the teeth 173, and, at the same time, will be drawn down into the adjacent recesses 84 of the chain 43. The follower of the cam 113 consists of a roller 180 (see Fig. 5) at one end of a lever 181 fulcrumed at 182 on a member 183 extending vertically between front side frames 45. The roller 180 is held against the cam by a spring 184. The lever 181, at its other end, has a pin-and-slot connection 185 with a bar 186 which, together with a similar upper bar 187, form supports and distance pieces for the plates 94, 96 carrying the stops 90 and associated parts. The bars 186, 187 are slidably mounted on vertical guide rods 188 extending between the horizontal side frames 45 at the front of the apparatus. As will be apparent, the shoulders 93 of the selectors 40 rest normally on the stops 90, so that by lowering said stops (as is done by the cam 113 once in each cycle of operations) the selectors will be likewise lowered for the purpose above-mentioned.

The function of the cam 114 is to raise all the selectors 40, once in each cycle of operations, to their maximum height and thereafter permit them to fall until their shoulders 93 encounter the stops 90 selected by the jacquard. The follower of the cam 114 consists of a roller 190 (see Fig. 5) on one end of a lever 191 which is fulcrumed at 192 on a member 193 depending from the upper horizontal 45 at the front. The roller 190 is held against the cam by a spring 194. The lever 191, at its other end, has an adjustable pin-and-slot connection 195 (see Fig. 3) with a plate 196 secured to the bar 48, previously referred to, and a lower bar 197, both bars 48, 197 being slidably mounted on the rods 188. As shown, each selector 40 is formed with a projection 198 adapted to co-operate with the bar 48, the arrangement being such that, when the cam 114 causes the bar 48 to rise, the latter engages with the projections 198 and so raises the selectors away from the positions in which they are supported by the stops 90.

The function of the cam 115 is to reciprocate the gripper G along the guides 51. To this end, the guide-blocks 49, 50 carrying the gripper jaws 41, 42, are each provided with a clamp 200 by which one of two traction wires 201 is secured to the respective block. Each wire 201 is led around guide pulleys 202 to one of two wheels 203 around which it is wrapped. The wheels 203 are secured to a shaft 204 journalled in stationary bearings, one of which is indicated at 205 (see Fig. 1). As will be apparent, rocking of the shaft 204 and wheels 203 will result in reciprocation of the gripper G. The shaft 204 is provided with a gear-wheel 206 meshing with a toothed quadrant 207, which is pivotally mounted at 208. A crank arm 209 secured to the quadrant 207 is connected to a fork member 210, the forked end 210a of which straddles the shaft 101. A roller 211 on the end 210a enters the eccentric cam groove 115a. During each cycle of operations, the quadrant 207 and the gear-wheel 206 will be rocked to and fro, and the gripper G will accordingly be reciprocated from end to end of the guides 51.

The sprocket-wheels 55 serving to carry the conveyor C past the knitting machine K receive an intermittent rotational movement, which carries the link pairs of each chain in succession into line with the sinkers 32. As shown in Fig. 4, the shaft 58 carrying the sprocket-wheels 55 is provided with a ratchet-wheel 220 adapted to be stepped round by a pawl 221 secured to one end of a rock-lever 222 freely journalled on the shaft 58. The lever 222, at its other end, is connected to a fork-member 223 which straddles the main shaft 35 and which carries a roller 224 entering the cam-groove 225a of an eccentric cam 225 on the shaft 35. The lever 222 receives a regular rocking motion from the cam, and consequently the requisite rotational movements are transmitted to the sprocket wheels 55. The ratchet-wheel is provided with the usual detent, as indicated conventionally at 226. The entire arrangement is such that the sprocket-wheels receive the same number of intermittent movements as there are selectors (i. e. eight, in the example shown) in each cycle of operations.

One cycle of operations will now be described. The cam 114 raises all the selectors 40 to their maximum height. One of the jacquard cards 25 is pressed by the card-cylinder 21 against the needles 22, after which the griffe-frame 20 rises thereby pulling one selected stop 90 of each vertical row of such stops into the operative position, in which position a stop has been indicated at 90a in Fig. 1. After a short pause, during which the above-mentioned selection of the stops 90 has been made, the cam 114 allows the selectors to fall slowly until their shoulders 93 encounter and rest upon the selected stops. In this position of the selectors, a horizontal row of guide-tubes 63 is at the level of the gripper G, which is meanwhile advancing with open jaws towards the selectors under the control of the cam 115. Just as the gripper G is about to change its direction of movement, the trigger 68 encounters the abutment 72, which causes the gripper jaw 42 to snap down on the jaw 41 and to seize the short ends of thread $w^2$ projecting from the guide-tubes 63 of the aforesaid row. The gripper G now is withdrawn to the rear end of its range of movement and pulls the thread ends, which it has seized, through the locking tumblers 60; the thread parts thus pulled out are denoted by $w^3$ and constitute the wefts. As the gripper G reaches said rear end it pauses, and, during the pause, the pressure-bars 140, 141, are caused by their cam 110 to lower upon the wefts $w^3$ and press their rear ends into the recesses 84 of the chain 44. At the same time, all the selectors 40 are lowered a short distance by the cam 113, and the front ends of the wefts $w^3$ are accordingly pulled into the recesses 84 of the chain 43 and also into the spaces between the teeth 173. Immediately thereafter, the knives 170 are slid across the teeth 173 by the cam 112, and so the wefts $w^3$ are severed, leaving a fresh row of thread ends $w^2$ for the next cycle of operations. Immediately after the wefts have been severed, the gripper jaws are opened by the cam 111 and the rear ends of the wefts $w^3$ are released. As the gripper G advances again, the cam 109 causes the sprocket wheels 53, 53, and 54, 54, to be turned through 90°, and so the conveyor section carrying the cut threads constituting the wefts $w^3$ will be advanced a step towards the knitting machine K, and a new section ready to receive fresh wefts $w^3$ will be advanced into line with the selectors. Meanwhile, a conveyor section in advance of that which has just received the wefts $w^3$ is passing link-by-link past the knitting machine. As each weft, indicated by $w^4$, of said section moves into line with the row of sinkers 32, the latter advance and carry the weft bodily against the warp threads $t^1$, by which the weft is knitted into the fabric $f$ composed of the preceding wefts and rib warps $t^2$.

The fabric $f$ can be cut as required in any usual manner between the rows $t^2$ of rib warps, into strips of chenille weft.

While apparatus for manufacturing chenille preparatory cloth has been fully described hereinbefore, it is to be understood that the invention is not confined thereto but can be generally employed in connection with the manufacture of various fabrics in which wefts are used and incorporated into the fabric by means of needles.

Moreover, as will be apparent, in apparatus for manufacturing chenille preparatory cloths or other fabrics of simple design, instead of a jacquard, other selecting mechanism may be employed.

When manufacturing plain or striped fabrics the jacquard control mechanism may be put out of action and the threads passed through an aligned row of guide-tubes 63 in the selectors. As a consequence, a number of thread ends will be presented in spaced relationship and in line and each time the gripper G advances it will seize and pull out the threads in order that they may be deposited on the conveyor and cut to length and thereafter transported to the needles. In this way, each time the gripper advances a mass of threads will be pulled forward and then deposited and cut to form wefts.

It will be seen, that wefts can be supplied in rapid succession to the sinkers and transferred by them to the needles. It will also be seen that the chain conveyor may be narrow or broad as desired and the gripping and cutting mechanism arranged to produce shorter or longer wefts as desired to suit the fabric being manufactured. For long wefts there may be several chains or other supports in the conveyor and suitable sinker arrangements for transferring the wefts to the needles.

I claim:—

1. Apparatus comprising the combination of independent selectors, guiding means on each selector for leading-in a number of threads and holding the end thereof projecting, means controlling said selectors, said controlling means being adapted to move said selectors relatively to one another so as to bring selected guiding means with their projecting thread ends into alignment, a conveyor arranged adjacent said selectors, a gripper adapted to seize the aligned projecting thread ends and pull them across the conveyor, means for forcing the pulled threads into engagement with the conveyor, cutting means for severing said pulled threads, needle means located adjacent said conveyor for binding said threads together, means for operating said conveyor so as to move the severed threads successively into the proximity of said binding means, and movable sinkers for transferring said threads from said conveyor to said binding means.

2. Apparatus comprising the combination of independent selectors, non-return guiding means on each selector for leading-in a number of threads and holding the ends thereof projecting, means controlling said selectors, said controlling means being adapted to move said selectors relatively to one another so as to bring selected guiding means with their projecting thread ends into alignment, a pair of endless conveyor chains arranged adjacent said selectors, thread-engaging means on said conveyor chains, a gripper adapted to seize the aligned projecting thread ends and pull them across said chains, means for forcing the pulled threads into engagement with the thread-engaging means, cutting means for severing said pulled threads, needle means located adjacent said conveyor chains for binding said threads together, means for operating said conveyor chains so as to move the thread-engaging means with the severed threads successively into the proximity of said binding means, and movable sinkers for transferring said threads from said thread-engaging means to said binding means.

3. Apparatus comprising the combination of independent selectors, guiding means on each selector for leading-in a number of threads and holding the ends thereof projecting, means controlling said selectors, said controlling means being adapted to move said selectors relatively to one another so as to bring selected guiding means with their projecting thread ends into alignment, a conveyor arranged adjacent said selectors, a gripper slidably mounted adjacent said selectors and said conveyor, said gripper comprising a pair of jaws, spring means for pressing said jaws together in order to seize the aligned threads, means for moving said gripper towards and away from said guiding means in order to seize and pull the threads across the conveyor, means for forcing said threads when pulled across the conveyor into engagement therewith, cutting means for severing said threads, cam-actuated means for opening said jaws in order to release the threads, needle means located adjacent said conveyor for binding said threads together, means for operating said conveyor so as to move the threads when severed and released successively into the proximity of said binding means, and movable sinkers for transferring said threads from said conveyor to said binding means.

4. Apparatus comprising the combination of independent selectors, guiding means on each selector for leading-in a number of threads and holding the ends thereof projecting, means controlling said selectors, said controlling means being adapted to move said selectors relatively to one another so as to bring selected guiding means with their projecting thread ends into alignment, a double-sided conveyor arranged adjacent said selectors, a gripper adapted to seize the aligned projecting thread ends and pull them across both sides of the conveyor, means for moving the selectors in unison so that they carry said guiding means towards said conveyor and thereby force the pulled threads into engagement with one side thereof, means for pressing upon the pulled threads so as to force them into engagement with the other side of the conveyor, cutting means for severing said pulled threads, needle means located adjacent said conveyor for binding said threads together, means for operating said conveyor so as to move the severed threads in parallel formation successively into the proximity of said binding means, and movable sinkers for transferring said threads from said conveyor to said binding means.

5. Apparatus comprising the combination of independent selectors, guiding means on each selector for leading-in a number of threads and holding the ends thereof projecting, means controlling said selectors, said controlling means being adapted to move said selectors relatively to one another so as to bring selected guiding means with their projecting thread ends into alignment, a conveyor arranged adjacent said selectors, a gripper adapted to seize the aligned projecting ends and pull them across the conveyor, a number of spaced teeth arranged between the selectors and the conveyor, means for forcing said threads into engagement with the conveyor and between said teeth, a number of knives mounted in sliding contact with said teeth, means for effecting relative movement between said knives and teeth in order to sever the threads, means located adjacent said conveyor for binding said threads together, means for operating said conveyor so as to move the severed threads successively into the proximity of said binding means, and movable sinkers for transferring said threads from said conveyor to said binding means.

6. Apparatus comprising the combination of independent selectors, guiding means on each selector for leading-in a number of threads and holding the end thereof projecting, movable stops co-operating with the individual selectors, selecting mechanism for actuating said stops, means for moving said selectors to extents determined by said stops so as to bring selected guiding means with their projecting thread ends into alignment, a conveyor arranged adjacent said selectors, a gripper adapted to seize the aligned projecting thread ends and pull them across the conveyor, means for forcing the pulled threads into engagement with the conveyor, cutting means for severing said pulled threads, needle means located adjacent said conveyor for binding said threads together, means for operating said conveyor so as to move the severed threads successively into the proximity of said binding means, and movable sinkers for transferring said threads from said conveyor to said binding means.

7. Apparatus comprising the combination of independent selectors, non-return guiding means on each selector for leading-in a number of threads and holding the ends thereof projecting, movable stops co-operating with the individual selectors, selecting mechanism for actuating said stops, means for moving said selectors to extents determined by said stops so as to bring selected guiding means with their projecting thread ends into alignment, a pair of endless conveyor chains arranged adjacent said selectors, thread-engaging means on each of said conveyor chains, a gripper adapted to seize the aligned projecting thread ends and pull them across said chains, means for moving said selectors in unison so as to force the pulled threads into engagement with the thread-engaging means of one of said chains, means for pressing upon the pulled threads so as to force them into the thread-engaging means of the other of said chains, cutting means for severing said pulled threads, needle means located adjacent said conveyor chains for binding said threads together, means for operating said conveyor chains so as to move the thread-engaging means with the severed threads successively into the proximity of said binding means, and movable sinkers for transferring said threads from the thread-engaging means to said binding means.

8. Apparatus comprising the combination of independent slidably mounted rods, guiding means on each of said rods for leading-in a number of threads and holding the end thereof projecting, movable stops co-operating with shoulders on the individual rods, selecting mechanism for actuating said stops, means for sliding said rods to extents determined by said stops so as to bring selected guiding means with their projecting thread ends into alignment, a conveyor arranged adjacent said rods, a gripper adapted to seize the aligned projecting thread ends and pull them across the conveyor, means for forcing the pulled threads into engagement with the conveyor, cutting means for severing said pulled threads, needle means located adjacent said conveyor for binding said threads together, means for operating said conveyor so as to move the severed threads successively into the proximity of said binding means, and movable sinkers for transferring said threads from said conveyor to said binding means.

9. Apparatus comprising the combination of independent slidably mounted rods, non-return guiding means on each rod for leading-in a number of threads and holding the ends thereof projecting, movable stops co-operating with shoulders on the individual rods, selecting mechanism for actuating said stops, means for sliding said rods to extents determined by said stops so as to bring selected guiding means with their projecting thread ends into alignment, a pair of endless conveyor chains arranged adjacent said selectors, thread-engaging means on each of said conveyor chains, a gripper adapted to seize the aligned projecting thread ends and pull them across said chains, means for moving said rods in unison so as to force the pulled threads into engagement with the thread-engaging means of one of said chains, means for pressing upon the pulled threads so as to force them into the thread-engaging means of the other of said chains, cutting means for severing said pulled threads, knitting mechanism located adjacent said conveyor chains, means for operating said conveyor chains so as to move the thread-engaging means with the severed threads successively into the proximity of said knitting mechanism, and movable sinkers for transferring said threads from the thread engaging means to said knitting mechanism whereby the threads are knitted together to form a fabric.

10. The combination with a warp knitting machine, including needles and sinkers, of an apparatus comprising a number of guides through which threads can be led, an endless conveyor arranged adjacent to said guides, a gripper slidably mounted with respect to said conveyor, said gripper being adapted to seize the ends of threads projecting from said guides, means for moving said gripper so as to pull said threads across the conveyor, mechanism for moving the conveyor intermittently in sections past the guides, means for forcing the pulled threads into engagement with a conveyor section, and mechanism for moving the conveyor step-by-step away from said guides and past the knitting machine, so that the threads are conveyed one at each step in advance of the sinkers, which are adapted to transfer them to the needles in order to be bound together thereby to form a fabric.

11. The combination with selecting mechanism and a machine including needles and sinkers of an apparatus comprising movable selectors, each provided with a number of guides through which threads can be led and each controlled by the selecting mechanism, a conveyor adjacent to said selectors, a gripper slidably mounted with respect to said conveyor, said gripper being adapted to seize the ends of selected threads which have been carried by the selectors into alignment at the gripper level and to pull said threads across the conveyor, means for forcing the pulled threads downwards into engagement with the conveyor, and mechanism for moving the conveyor so that said threads are conveyed thereby in parallel formation from the vicinity of the selectors to said machine, the threads being there transferred by the sinkers to the needles and bound together thereby to form a fabric.

12. The combination with jacquard selecting mechanism and a warp knitting machine, including needles and sinkers, of an apparatus comprising movable selectors, each provided with a number of guides through which coloured threads can be led and each controlled by the selecting mechanism, an endless conveyor adjacent to said selectors, a gripper slidably mounted above said conveyor, said gripper being adapted to seize the ends of selected threads which have been carried by the selectors into alignment at the gripper level and to pull said threads across the conveyor, means for forcing the pulled threads downwards into engagement with the conveyor, and mechanism for moving the conveyor so that said threads are conveyed thereby in parallel formation from the vicinity of the selectors to the knitting machine, the threads being there transferred by the sinkers to the needles and knitted together thereby to form a fabric.

13. The combination with jacquard selecting mechanism and a warp knitting machine, including needles and sinkers, of an apparatus comprising movable selectors, a number of guides therein through which coloured threads can be led, means for raising said selectors to a limiting position and for allowing them to fall, means controlled by said mechanism for engaging the selectors as they fall and for holding them in positions in which selected guides are arranged in alignment, an endless conveyor adjacent to said selectors, gripper jaws slidably mounted above said conveyor, said jaws being adapted to close and open at timed intervals so as to seize and release the ends of threads projecting from said selected guides, means for moving said gripper jaws to pull the threads when seized thereby across the conveyor, means for forcing the pulled threads downwards into engagement with the conveyor, and mechanism for moving the conveyor so that said threads, when released by said jaws, are conveyed in parallel formation from the vicinity of the selectors to the knitting machine, the threads being there transferred by the sinkers to the needles and knitted together thereby to form a fabric.

14. In the manufacture of chenille and other textile fabrics, supplying a mass or multiplicity of threads in spaced relationship and in line side-by-side, cutting these threads to a desired length, conveying the cut threads forward sidewise in succession and stitching them together to produce a fabric.

15. In the manufacture of chenille and other textile fabrics, supplying a mass or multiplicity of threads in spaced relationship and in line side-by-side, cutting these threads to a desired length, conveying the cut threads forward sidewise in succession and stitching them together, one at a time, as wefts to produce a fabric.

16. In the manufacture of chenille and other textile fabrics, supplying a mass or multiplicity of coloured threads, selecting certain of these threads and bringing them into line side-by-side, cutting all the selected threads to a desired length, conveying the cut threads forward sidewise in parallel formation, and stitching them together to produce a fabric.

17. The method of manufacturing chenille weft cloth and other textile fabrics which consists in selecting and bringing into alignment side-by-side from a number of available coloured threads a group thereof, conveying said group of threads sidewise in parallel formation and stitching said threads (as wefts) together to produce a fabric.

18. The method of manufacturing chenille weft cloth and other textile fabrics which consists in selecting and bringing into alignment side-by-side from a number of available coloured threads groups thereof in succession, severing the threads of each group, conveying said groups sidewise in stages with the threads arranged in parallel formation and stitching said threads in succession together to produce a fabric.

19. Apparatus comprising the combination of guiding means for leading-in a number of threads and holding the projecting ends thereof spaced apart in a row, conveying means adjacent said guiding means, a gripper adapted to pull the row of projecting ends away from said guiding means so that said threads are arranged side-by-side across the conveying means, means for engaging said threads with the conveyor, cutting means for severing said threads from the guiding means, stitching means located adjacent said conveying means, means for operating said conveying means so as to move the severed threads sidewise in succession into the proximity of said stitching means, and movable members for transferring said threads from said conveying means to said stitching means in order to produce a fabric.

20. Apparatus comprising the combination of guiding means for leading-in a number of threads and holding the projecting ends thereof spaced apart in a row, a pair of endless conveyor elements arranged adjacent said means, thread-engaging means in said conveyor elements, a gripper adapted to pull the row of projecting ends away from said guiding means so that said threads are arranged side-by-side across said elements, means for placing said threads in engagement with said thread-engaging means, cutting means for severing said threads from the guiding means, stitching means located adjacent said elements, means for operating said elements so as to move said thread-engaging means successively into the proximity of said stitching means, and movable members for transferring the threads from said thread-engaging means to said stitching means in order to produce a fabric.

21. Apparatus comprising the combination of guiding means for leading-in a number of threads and holding the projecting ends thereof spaced apart in a row, a conveyor arranged adjacent said means, a gripper slidably mounted adjacent said guiding means and said conveyor, said gripper comprising a pair of jaws, spring means for pressing said jaws together in order to seize the projecting thread ends, means for moving said gripper towards and away from said guiding means in order to seize and pull the threads side-by-side across the conveyor, means for forcing said threads (when thus pulled) into engagement with the conveyor, cutting means for severing said threads from the guiding means, stitching means located adjacent said conveyor, means for operating said conveyor so as to move the severed threads sidewise in succession into the proximity of said stitching means, and movable members for transferring said threads from said conveyor to said stitching means in order to produce a fabric.

22. Apparatus comprising the combination of guiding means for leading-in a number of threads and holding the projecting ends thereof spaced apart in a row, a conveyor arranged adjacent said means, a gripper slidably mounted adjacent said guiding means and said conveyor, said gripper comprising a pair of jaws, spring means for pressing said jaws together in order to seize the projecting thread ends, means for moving said gripper towards and away from said guiding means in order to seize and pull the threads side-by-side across the conveyor, means for forcing said threads (when thus pulled) into engagement with the conveyor, cutting means for severing said threads from the guiding means, cam-actuated means for opening said jaws in order to release the threads, a trigger device for maintaining said jaws open until tripped by a stationary abutment, stitching means located adjacent said conveyor, means for operating said conveyor so as to move the severed threads sidewise in succession into the proximity of said stitching means, and movable members for transferring said threads from said conveyor to said stitching means in order to produce a fabric.

23. Apparatus comprising the combination of guiding means for leading-in a number of threads and holding the projecting ends thereof spaced apart in a row, a double-sided conveyor arranged adjacent said means, a gripper adapted to seize the row of projecting ends and pull said threads through said guiding means and across both sides of the conveyor, means for moving said guiding means so as to force the pulled threads into engagement with one side thereof, separate means for pressing upon the pulled threads so as to force them into engagement with the other side of the conveyor, cutting means for severing said threads from the guiding means, stitching means located adjacent said conveyor, means for operating said conveyor so as to move the severed threads sidewise in succession into the proximity of said stitching means, and movable members for transferring said threads from said conveyor to said stitching means in order to produce a fabric.

24. Apparatus comprising the combination of guiding means for leading-in a number of threads and holding the projecting ends thereof spaced apart in a row, a conveyor arranged adjacent said means, a gripper adapted to pull the row of projecting ends away from said guiding means so that said threads are arranged side-by-side across the conveyor, a number of spaced teeth at one side of the conveyor, means for forcing said threads into engagement with the conveyor and between said teeth, a number of knives mounted in sliding contact with said teeth, means for effecting relative movement between said knives and teeth in order to sever the threads from the guiding means, stitching means located adjacent said conveyor, means for operating said conveyor so as to move the severed threads sidewise in succession into the proximity of said stitching means, and movable members for transferring said threads from said conveyor to said stitching means in order to produce a fabric.

In testimony whereof I affix my signature.

JAMES MORTON.